United States Patent [19]
Guthrie et al.

[11] 3,787,303
[45] Jan. 22, 1974

[54] RADIATION CURABLE POLYENE-POLYTHIOL COATING COMPOSITIONS

[75] Inventors: James L. Guthrie, Ashton; Francis J. Rendulic, Ellicott City, both of Md.

[73] Assignee: W. R. Grace & Co., New York, N.Y.

[22] Filed: Dec. 17, 1971

[21] Appl. No.: 209,369

[52] U.S. Cl...... 204/159.15, 117/93.31, 117/132 R, 117/132 B, 117/155 R, 117/155 UA, 204/159.14, 204/159.18, 204/159.19, 260/16, 260/31.8 M, 260/368 XA, 260/318 Z, 260/33.2 R, 260/45.95, 260/755, 260/75 UA, 260/837 R, 260/829, 260/861, 260/865, 260/873
[51] Int. Cl............................. B01j 1/10, B01j 1/12
[58] Field of Search..... 204/159.14, 159.18, 159.15; 260/77.5, 79.7, 79.5 R, 79, 75 S, 75 UA

[56] References Cited
UNITED STATES PATENTS

| | | | |
|---|---|---|---|
| 3,656,999 | 4/1972 | Lundsager | 260/79 |
| 3,625,925 | 12/1971 | Oswald et al. | 204/159.18 |
| 3,661,744 | 5/1972 | Kehr et al. | 204/159.14 |
| 3,662,023 | 5/1972 | Kehr et al. | 260/79.50 |

Primary Examiner—Murray Tillman
Assistant Examiner—Richard B. Turer
Attorney, Agent, or Firm—Charles L. Harness et al.

[57] ABSTRACT

The invention disclosed is directed to a method for overcoating which includes applying to a substrate a novel photocurable lacquer composition having as essential ingredients a polyene selected from a particular group of polyenes which contain at least 2 reactive unsaturated carbon-to-carbon bonds per molecule, a polythiol containing 2 or more thiol groups per molecule and a resin component; and thereafter exposing the applied composition to actinic radiation for a period of time sufficient to photocure the applied composition to provide an overcoating. Optionally, a sensitizer may be included if desired to decrease curing time and improve efficiency. The method is particularly useful for high speed overcoating printed metal articles such as cans. Overcoatings thus provided are found to be characterized by high strength, good scratch resistance, freedom from tackiness and excellent transparency.

8 Claims, No Drawings

RADIATION CURABLE POLYENE-POLYTHIOL COATING COMPOSITIONS

The present invention relates to a photocurable lacquer composition which includes a polyene component containing at least two unsaturated carbon-to-carbon bonds per molecule, a polythiol component containing on the average at least two —SH functional groups per molecule, and a resin component. The invention also provides a method for overcoating articles wherein an applied coating of the composition is cured by means of actinic radiation to produce a protective coating which is typically clear, tough and durable.

It is well known in the art that protective functional overlayers of transparent synthetic organic coating materials may be formed on various substrates. Typically, the prior art coating materials have been baked at high temperatures to form coatings on substrates, printed and non-printed. Many prior art coating materials contain various harmful solvents which are released as vapors upon baking. Not only do the released vapors present pollution problems, but also baking is costly and time consuming. Further, use of high bake temperatures often results in discoloration of inks or pigments disposed on the articles being coated. Generally, use of lower bake temperatures further slows the prior art lacquering processes, while use of higher temperatures further limits the types of inks which may be satisfactorily applied prior to applying protective overcoatings. In preparing printed cartons from printed paperboard, it is conventional to apply overcoatings such as heat-curable lacquers and press varnishes which, in practice, generally have required in process dusting with starch powders or the like and extended aging prior to making cartons from the overcoated sheets.

It has now been found by practice of the present invention that printed articles may be overlayered with a transparent protective coating in rapid, simple and efficient manner without requiring high temperatures or evolution of solvent vapor. Numerous defects of prior art overcoating compositions and methods may be effectively overcome by the present invention which provides a clear coating composition and method for overcoating using actinic radiation to cure an applied coating of the composition. Upon exposure to actinic radiation, the composition cures rapidly to a typically clear coating which has good lubricity, withstands abrasion, exhibits high gloss, effectively adheres to a variety of substrates, and is substantially odorless. The present method is especially useful for high-speed coating on metal substrates such as metal sheets, printed and non-printed, from which articles such as cans are formed. Upon curing, the composition effectively adheres to both the metal and to intermediate layers such as inks and the like which typically are disposed on the metal in the metal decorating field. Other printed substrates which may be coated using the present method include magazine-quality paper and paperboard. Typically, printed paperboard may be coated using the present method and thereafter passed to carton finishing operations without requiring aging and without need for dusting.

Generally stated, the present invention provides a method for overcoating which includes applying to a substrate a photocurable lacquer composition having (a) a polythiol component containing at least two —SH groups per molecule, (b) a polyene component selected from particular polyenes (subsequently set forth herein) which contain 2 or more terminally positioned unsaturated carbon-to-carbon bonds per molecule and are characterized in that they will react with the polythiol to form tough and durable coatings, and (c) a resin component. Optionally, a sensitizer component may be included if desired to decrease curing time and improve efficiency. Curing of the applied composition is effected by exposure to a free radical generator such as actinic radiation to form, typically, clear, tough, durable polythioether coatings.

Polyenes useful herein include triallyl isocyanurate; Bisphenol A diallyl ether; the diadduct of diallyl amine and Bisphenol A 4,4'-diglycidyl ether; the diadduct of a member selected from the group consisting of allyl alcohol, diallyl malate, and trimethylolpropane diallyl ether and a member selected from the group consisting of toluene diisocyanate, 3,3'-dimethyl-4,4'-biphenylene diisocyanate, 3-isocyanatomethyl-3,5,5-trimethylcyclohexyl isocyanate, 4,4'-methylenebis-(cyclohexyl isocyanate), and Solithane 291 (trademark for a polyester isocyanate product by Thiokol having molecular weight of about 2,800 and prepared by reacting ethylene glycol, propylene glycol, adipic acid and toluene diisocyanate). The various polyenes may be obtained commercially or may be readily prepared from commercially available reactants. Methods for preparing a number of these polyenes are set forth subsequently in the examples included in this description. Preferred polyenes are triallyl isocyanurate, Bisphenol A diallyl ether and the diadduct of toluene diisocyanate and diallyl malate.

The polythiol component has a molecular weight in the range from about 50 to about 20,000 and the general formula:

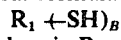

wherein $R_1$ represents a polyvalent organic moiety free from reactive carbon-to-carbon unsaturation and B is a numeral of at least 2. Thus, $R_1$ may contain cyclic groupings and hetero atoms such as N, P, or O and primarily contains carbon-carbon, carbon-hydrogen, carbon-oxygen or silicon-oxygen containing chain linkages free of any reactive carbon-to-carbon unsaturation. The ene/thiol mole ratio is selected so as to provide a solid, self-supporting cured product under ambient conditions in the presence of a free radical generator.

The polythiol may be a simple or complex organic compound having a multiplicity of pendant or terminally positioned —SH functional groups per average molecule.

On the average, the polythiol must contain 2 or more —SH groups/molecule and have a viscosity range of essentially 0 to 20 million centipoises (cps) at 70°C as measured by a Brookfield Viscometer either alone or when in the presence of an inert solvent, aqueous dispersion or plasticizer. Operable polythiols usually have molecular weights in the range about 100 to about 20,000, and preferably from about 200 to about 10,000.

One class of polythiols curable with polyenes to obtain essentially odorless polythioether products are esters of thiol-containing acids of the formula HS-R₂-COOH where $R_2$ is an organic moiety containing no reactive carbon-to-carbon unsaturation with polyhydroxy compounds of structure $R_3$—OH$)_n$ where $R_3$ is an organic moiety containing no reactive carbon-tocarbon unsaturation, and n is 2 or greater. These components will react under suitable conditions to give a polythiol having the general structure:

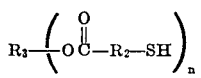

where $R_2$ and $R_3$ are organic moieties containing no reactive carbon-to-carbon unsaturation, and n is 2 or greater.

Certain polythiols such as the aliphatic monomeric polythiols exemplified by ethane dithiol, hexamethylene dithiol, decamethylene dithiol, tolylene-2,4-dithiol, and the like, and some polymeric polythiols such as a thiol-terminated ethylcyclohexyl dimercaptan polymer, and the like, and similar polythiols which are conveniently and ordinarily synthesized on a commercial basis, although having obnoxious odors, are operable but many of the end products may not be widely accepted from a practical, commercial point of view.

The preferred polythiol compounds are characterized by a low level of mercaptan-like odor initially, and after reaction, give essentially odorless polythioether coatings which are commercially attractive and practically useful for both indoor and outdoor applications.

Examples of the polythiol compounds preferred because of relatively low odor level include but are not limited to esters of thioglycolic acid (HS-CH$_2$-COOH), 2-mercaptopropionic acid (HS-CH(CH$_3$)-COOH) and 3-mercaptopropionic acid (HS-CH$_2$CH$_2$COOH) with polyhydroxy compounds such as glycols, triols, tetraols, pentaols, hexaols, and the like. Specific examples of the preferred polythiols include but are not limited to ethylene glycol bis (thioglycolate), ethylene glycol bis (3-mercaptopropionate), trimethylolpropane tris (thioglycolate), trimethylolpropane tris (3-mercaptopropionate), pentaerythritol tetrakis (thioglycolate), pentaerythritol tetrakis (3-mercaptopropionate), and pentaerythritol tetrakis (3-mercaptopropyl ether), all of which are commercially available. A specific example of a preferred polymeric polythiol is polypropylene ether glycol bis (3-mercaptopropionate) which is prepared from polypropylene-ether glycol (e.g., Pluracol P2010, Wyandotte Chemical Corp.) and 3-mercaptopropionic acid by esterification.

Resins useful herein include linear or branched polyesters, preferably linear, having molecular weight from about 500 to about 100,000 and preferably from about 1000 to about 50,000 which may be prepared by reacting a polybasic acid or anhydride having the general formula

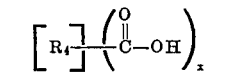

in acid form with a polyhydric alcohol having the general formula [R$_5$———OH)$_y$ wherein x and y are numerals of 2 or more and preferably 2 to 4, and R$_4$ and R$_5$ are saturated or unsaturated hydrocarbyl groups having valence of x and y respectively.

The polybasic acid or anhydride reactant may be, for example, phthalic acid or phthalic anhydride, maleic acid or maleic anhydride, adipic acid, trimellitic acid or trimellitic anhydride, succinic acid or succinic anhydride, fumaric acid, terephthalic acid, itaconic acid, glutaric acid, isophthalic acid, the adduct of levopimaric acid with maleic acid, and mixtures thereof.

The polyhydric alcohol reactant may be, for example, ethylene glycol, diethylene glycol, polyethylene glycol, propylene glycol, dipropylene glycol, polypropylene glycol, 1,3-propanediol, 1,4-butanediol, neopentyl glycol, pentaery-thritol, glycerol, trimethylolpropane, Bisphenol A (4,4-isopropylidenediphenol), and 1,4-dihydroxymethylbenzene.

Other soluble resins which are useful herein are polyester-polyenes which may be prepared by capping the polyester resins described hereinabove with a member having the general formula

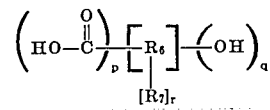

wherein $R_6$ typically represents a saturated alkyl member having a molecular weight from about 100 to about 400, p and q are numerals from 0 to 10 and preferably 1 with the sum of p and q always equal to or greater than 1, and with r being a numeral from 1 to 10 and preferably from 2 to 8. Alternatively, [R$_6$] may be absent, in which instance the hydroxyl and/or carboxyl groups are joined directly to [R$_7$] as exemplified by allyl alcohol or acrylic acid. Typically, the sums of numerals x and p are approximately equal to the sums of numerals y and r.

In the above formula, [R$_7$] may be selected from the group consisting of:

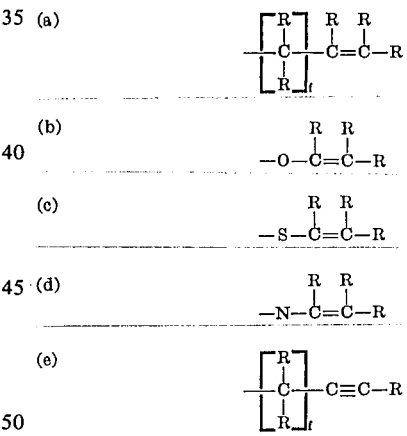

In the groups (a) to (e), f is an integer from 1 to 9; R is a radical selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, and cycloalkyl and substituted cycloalkyl. The substitutents on the substituted members are selected from the group consisting of nitro, chloro, fluoro, acetoxy, acetamide, phenyl, benzyl, alkyl, alkoxy and cycloalkyl. Alkyl and alkoxy have from 1 to 9 carbon atoms and cycloalkyl has from 3 to 8 carbon atoms.

Useful capping agents include, for example, allyl alcohol, trimethylolpropane diallyl ether, diallyl malate, diallyl tartrate, 2-vinyloxyethanol, vinyl hydroxyethyl sulfide, 10-undecylenyl alcohol, allyl maleate, allyl phthalate, diallyl trimellitate, N-Methyl-N-vinylethanolamine, and 4-vinyloxybenzyl alcohol.

The polyester-polyene resin has a molecular weight in the range from about 64 to 20,000, preferably about 200 to about 10,000 and a viscosity in the range from essentially 0 to 20 million centipoises at 70°C. as measured by a Brookfield Viscometer. The polyester-polyene is characterized by having at least two unsaturated carbon-to-carbon bonds disposed at terminal or near terminal positions on a main chain of the molecule or pendant therefrom.

It is found that the polyester-polyene resin is co-curable, i.e. upon exposing the lacquer to a free radical generator such as actinic radiation the polyester-polyene reacts with a portion of the polythiol in a manner generally analogous to the polyene component to form polythioether linkages. Advantageously, however, the polyester-polyenes generally minimize the amount of polythiol necessary to effect curing of the lacquer composition to solid durable overcoatings.

The polyester-polyenes are disclosed in copending Guthrie application, "Curable Liquid Pigment Composition and Method," Ser. No. 188,608, filed Oct. 12, 1971, assigned to the same assignee hereof and incorporated herein in pertinent part by reference.

Other resins which may be included in the present lacquer composition include, for example, carbohydrates, preferably sucrose octa-acetate and sucrose acetate-butyrate. Still other resins useful herein include, for example, polyvinyl acetate, polyvinyl alcohol, polystyrene, esters of abietic acid, polymers of α- or β-pinene, indenecoumarone copolymers, and the like.

Other resins which may usefully be included in the lacquer composition are liquid plasticizers such as polyethylene glycol having molecular weight of up to about 400, dioctyl phosphate, dibutyl phthalate and the like.

The resin component may be included in any effective amount. Generally, the resin may suitably be included in an amount from about 1 to about 50 parts by weight, and preferably from about 10 to about 50 parts by weight, per 100 parts by weight of polyene-polythiol combination.

The polyene has two or more reactive unsaturated carbon-to-carbon bonds located terminal from the main chain. The polythiol has two or more thiol groups per molecule. After the polyene, polythiol and resin are combined and if desired, with additional materials, as may be required, the curable lacquer composition is applied to a printed substrate and thereafter exposed to a free radical generator such as actinic radiation to give an essentially odorless solid elastomeric overcoating. Although as a practical matter, actinic radiation is preferred, it is recognized that chemical free radial generating reagents may be employed as well as high energy radiation bombardment.

Although the mechanism of the curing reaction is not completely understood, it appears most likely that the curing reaction may be initiated by most any chemical free radical generating reagent which dissociates or abstracts a hydrogen atom from an SH group, or accomplishes the equivalent thereof.

Generally the rate of the curing reaction may be increased by increasing the temperature of the composition at the time of initiation of cure. In many applications, however, the curing is accomplished conveniently and economically by operating at ordinary room temperature conditions.

The present curable lacquer compositions are characterized by insensitivity to visible light, rendering them generally free from setting on, for example, apparatus which may be used to apply the composition to a substrate. Upon exposure to actinic light, the present lacquer compositions are found to be rapidly curable making them eminently suitable for use in high speed coating operations.

A class of actinic light useful herein for curing is ultraviolet light and other forms of actinic radiation which are normally found in radiation emitted from the sun or from artificial sources such as type RS sunlamps, carbon arc lamps, xenon arc lamps, mercury vapor lamps, tungsten halide lamps and the like. Ultraviolet radiation may be used most efficiently if the curable lacquer composition contains a suitable photocuring rate accelerator. The ultraviolet region of the spectrum includes wave lengths from 100 to 3,800 Angstroms.

Curing periods may be adjusted to be very short and hence commerically economical by proper choice of ultraviolet source, photocuring rate accelerator and concentration thereof, temperature and molecular weight, and reactive group functionality of the polyene and polythiol. Curing periods of less than about 1 second duration are possible in preparing lacquer coatings having thickness in the range from about 0.1 to about 0.5 mil and even to about 2 mils in some applications.

Conventional curing inhibitors or retarders which may be used in order to stabilize the components of the curable lacquer compositions so as to prevent premature onset of curing may include hydroquinone; p-tert.-butyl catechol; 2,6-ditert.-butyl-p-methylphenol; phenothiazine; N-phenyl-2-naphthylamine; inert gas atmospheres such as helium, argon, nitrogen and carbon dioxide; vacuum; and the like. Acidic stabilizers such as phosphorous acid and the like may be usefully employed.

It is further understood that the polyene and the polythiol may be formed in situ in the photocurable lacquer composition without departing from the spirit of this invention.

Specifically useful herein are chemical photocuring rate accelerators such as benzophenone, acetophenone, azobenzone, acenapthene-quinone, o-methoxy benzophenone, Thioxanthen-9-one, xanthen-9-one, 7-H-Benz [de] anthracen-7-one, dibenzosuberone, 1-naphththaldehyde, 4,4'-bis (dimethylamino) benzophenone, fluorene-9-one, 1'-acetonaphthone, 2'-acetonaphthone, anthraquinone, 1-indanone, 2-tert.-butyl anthraquinone, valerophenone, hexanophenone, 8-phenyl-butyrophenone, p-morpholinopropiophenone, 4-morpholino-benzophenone, 4'-morpholinodeoxybenzoin, p-diacetylbenzene, 4-aminobenzophenone, 4'-methoxyacetophenone, benzaldehyde, α-tetralone, 9-acetylphenanthrene, 2-acetylphenanthrene, 10-thioxanthenone, 3-acetylphenanthrene, 3-acetylindole, 1,3,5-triacetylbenzene and the like, including blends thereof to greatly reduce the exposure times.

The curing rate accelerators are usually added in an amount ranging from about 0.0005 to about 50 percent by weight of the photocurable lacquer composition, with a preferred range being from about 0.05 to about 25 percent by weight. Preferred photocuring rate accelerators are the aldehyde and ketone carbonyl compounds having at least one aromatic nucleus attached directly to the

group.

The relative amounts of polyene and polythiol included in the photocurable lacquer composition are selected such that the mole ratio of ene:thiol is from about 0.2:1 to about 5:1, and preferably from about 0.75:1 to about 1.5:1.

Practice of the present invention will be further illustrated by the following non-limiting examples wherein all parts and percentages given are by weight unless indicated otherwise.

EXAMPLE 1

275 grams (1.86 moles) of phthalic anhydride, 60.8 grams (0.62 mole) of maleic anhydride, 90.5 grams (0.62 mole) of adipic acid, and 328 grams (3.09 moles) of diethylene glycol were heated in a vessel for three hours at 200°C. The resulting polyester resin product was cooled and removed from the vessel. A photocurable lacquer composition was prepared by mixing at 50°C 10 grams of the resin (a solid at 25°C) with 10 grams (0.04 mole) of triallyl isocyanurate, 14 grams (0.03 mole) of pentaerythritol tetrakis (3-mercaptopropionate), 0.5 gram of benzophenone, 0.025 gram of phosphorous acid, and 0.05 gram of Irganoz 1076 (trademark for a hindered phenol antioxidant product by Geigy Industrial Chemicals). The mixture was heated to 70°C to dissolve the benzophenone producing a clear homogeneous mixture having a viscosity in the range of 12,000 to 18,000 cps and a pH in the range of 4.5 to 5.5.

The photocurable lacquer was applied at 25°C to steel can body stock having a red printing ink printed thereon by conventional techniques. The lacquer was applied as a liquid film having a thickness of 0.2 to 0.4 mil using a conventional roller coater. The area of application included the printed area plus adjacent non-printed portions of the steel. The applied liquid film was exposed to ultraviolet light using a 5000 watt Hanovia lamp positioned 4 inches from the film. Exposure was for 3 to 5 seconds, during which time the liquid film cured to a clear solid coating which was found to be characterized with high gloss, strong bonding to both the printed ink and the steel, and excellent abrasion resistance.

EXAMPLE 2

A polyester resin was prepared at 200°C. using the resin preparation procedure of Example 1 except that, prior to cooling, 4.3 grams (0.02 mole) of trimethylolpropane diallyl ether was added and the temperature of the reactants was increased to 240°C, which temperature was maintained for one hour. The resin product was cooled and removed from the vessel. Analysis of the product showed it to be a polyester-tetraene which was a solid at 25°C. A curable lacquer composition was prepared by mixing 10 grams of this polyester-tetraene at 60°C with 10 grams (0.04 mole) of triallyl isocyanurate, 14 grams (0.03 mole) of pentaerythritol tetrakis (3-mercaptopropionate), 0.5 gram of benzophenone, 0.025 gram of phosphrous acid and 0.05 gram of Irganox 1076. This lacquer composition was applied as a film on printed steel can body stock and thereafter cured using the application and curing procedures of Example 1. The cured lacquer coating was found to be characterized with good clarity, high gloss, strong bonding to the printed ink and the steel, and excellent abrasion resistance.

EXAMPLE 3

12 grams of commercially available polyethylene glycol having a molecular weight of 400 was mixed with 10 grams of triallyl isocyanurate, 14 grams of pentaerythritol tetrakis (3-mercaptopropionate), 0.5 gram of benzophenone, 0.025 gram of phosphorous acid, and 0.05 gram of Irganox 1076. The resulting photocurable lacquer composition was roller-coated at 20° to 30°C onto paperboard having ink printed thereon. The area of lacquer application included printed and non-printed areas. The coated paperboard was exposed to ultraviolet light using a 5,000 watt Hanovia lamp positioned 3 inches from the paperboard. Exposure was for 3 to 5 seconds, during which time the lacquer cured to a clear solid coating which was found to be characterized with high gloss, strong bonding to both the printed ink and the paperboard, and excellent abrasion resistance.

EXAMPLE 4

10 grams of liquid polyester resin "LB 104-45" (commercially available from Marco Chemical Division of W. R. Grace & Co.) was mixed with 10 grams of allyl isocyanate, 14 grams of pentaerythritol tetrakis (3-mercaptopropionate), 0.5 gram of benzophenone, 0.025 gram of phosphorous acid, and 0.05 gram of Irganox 1076. A thin film of the resulting photocurable lacquer composition was applied to ink-printed and non-printed areas of steel can body stock using a roller. Next, the film was cured using the curing procedure of Example 1. The cured lacquer coating was found to be characterized with good clarity, high gloss, strong bonding to the printed ink and the steel, and excellent abrasion resistance.

EXAMPLE 5

A curable lacquer composition was prepared by mixing at 55°C 10 grams of the polyester-tetraene resin of Example 2 with 10 grams (0.04 mole) of triallyl isocyanurate, 10 grams of Bisphenol A diallyl ether, 23 grams of pentaerythritol tetrakis (3-mercaptopropionate), 0.5 gram of dibenzosuberone and 0.05 gram of Irganox 1076. This lacquer composition was applied as a 3-mil film on printed steel can body stock and thereafter cured using the application and curing procedures of Example 1. The cured lacquer coating was found to be characterized with good clarity, high gloss, strong bonding to the printed ink and steel and excellent abrasion resistance.

EXAMPLE 6

A photocurable lacquer was prepared at 65°C by mixing 10 grams of the polyester-tetraene resin of Example 2 with 31 grams of Bisphenol A diallyl ether, 24 grams of pentaerythritol tetrakis (3-mercaptopropionate), 1 gram of benzophenone and 0.05 gram of Irganox 1076. This photocurable lacquer was applied at 25°–30°C to steel can body stock having ink printed thereon. The lacquer was applied as a liquid film with a thickness of 0.3 to 0.5 mil using a conventional roller coater. The area of application included the printed area plus adjacent non-printed portions of the steel. The applied liquid film was exposed to ultraviolet light, using a 4,000 watt Ferro lamp positioned 3 to 4 inches from the film. Exposure was for 3–5 seconds, during which time the liquid film cured to a clear solid coating which was found to be characterized with high gloss, strong bonding to both the printed ink and the steel, and excellent abrasion resistance.

EXAMPLE 7

A photocurable lacquer was prepared at 60°C by mixing 10 grams of the polyester-tetraene resin of Example 2 with 31 grams of Bisphenol A diallyl ether, 24 grams of pentaerythritol tetrakis (3-mercaptopropyl ether), 2 grams of benzophenone, and 0.05 gram of Irganox 1076. A thin film of this photocurable lacquer composition was applied at 25°C to magazine quality paper having ink printed thereon. The lacquer was applied as a liquid film having a thickness of 0.05 to 0.1 mil using a conventional roller coater. The area of application included the printed area plus non-printed portions of the paper. The applied liquid film was exposed to ultraviolet light using a 5,000 watt Hanovia lamp positioned 4 inches from the film. Exposure was for about 3 seconds, during which time the liquid film cured to a clear solid coating which was found to be characterized with high gloss, strong bonding to both the printed ink and the paper, and excellent abrasion resistance.

EXAMPLE 8

459 grams (3.1 moles) of phthalic anhydride and 296 grams (3.09 moles) of ethylene glycol were heated in a vessel for 4 hours at 190°C. Next, 4.28 grams (0.02 mole) of trimethylolpropane diallyl ether was added. The temperature of the reactants was increased to 230°C, which temperature was maintained for 1 hour. The resin product was cooled and removed from the vessel. Analysis of the product showed it to be a polyester-tetraene which was a solid at 25°C. A curable lacquer composition was prepared by mixing 12 grams of this polyester-tetraene at 50°C. with 10 grams of triallyl isocyanurate, 14 grams of pentaerythritol tetrakis (3-mercaptopropionate), 0.5 gram of benzophenone, 0.025 gram of phosphorous acid, and 0.05 gram of Irganox 1076. This lacquer composition was applied as a thin film at 25° to 30°C on printed steel can body stock and thereafter cured using the application and curing procedures of Example 1. The cured lacquer coating was found to be characterized with good clarity, high gloss, strong bonding to the printed ink and the steel and excellent abrasion resistance.

EXAMPLE 9

To a resin kettle maintained under a nitrogen atmosphere and equipped with a condenser, stirrer, thermometer and gas inlet and outlet was added 174 grams (1 mole) of toluene diisocyanate, 428 grams (2 moles) of diallyl malate, along with 0.3 gram of stannous octoate as catalyst, and the reaction was continued for 2 hours at 60°C. 20 grams of the thus formed tetraene diadduct of diallyl malate and toluene diisocyanate was combined with 16.3 grams of pentaerythritol tetrakis (3-mercaptopropionate), 15 grams of the resin of Example 8, 0.5 gram of benzophenone and 0.05 gram of Irganox 1076. A thin photocured lacquer coating was formed of this photocurable lacquer composition on printed steel can body stock using the application and curing procedures of Example 1. The cured lacquer coating was characterized with good clarity, high gloss, excellent abrasion resistance and strong bonding to both the printed ink and the steel.

EXAMPLE 10

The procedure of Example 9 was repeated except that 528 grams (2 moles) of 3,3'-dimethyl-4,4'-biphenylene diisocyanate was substituted for the toluene diisocyanate. The results were substantially the same.

EXAMPLE 11

The procedure of Example 9 was repeated except that 358 grams (2 moles) of 3-isocyanatomethyl-3,5,5-trimethylcyclohexyl isocyanate was substituted for the toluene diisocyanate. The results were substantially the same.

EXAMPLE 12

The procedure of Example 9 was repeated except that 500 grams (2 moles) of 4,4'-methylenebis(cyclohexyl isocyanate) was substituted for the toluene diisocyanate. The results were substantially the same.

EXAMPLE 13

The procedure of Example 9 was repeated except that 116 grams (2 moles) of allyl alcohol was substituted for the diallyl malate. The results were substantially the same.

EXAMPLE 14

The procedure of Example 9 was repeated except that 430 grams (2 moles) of trimethylol propane diallyl ether was substituted for the diallyl malate. The results were substantially the same.

EXAMPLE 15

343 grams (1.1 mole) of 4,4'-diglycidyl ether of Bisphenol A (commercially available under the name Epon 828 by Shell Chemical Co.) was charged to a dry resin kettle maintained under nitrogen and equipped with a condenser, stirrer, thermometer and gas inlet and outlet. 190 grams (2 moles) of diallyl amine was added to the kettle and the reaction was continued with stirring for 3 hours at 70°C. A photocurable lacquer composition was prepared at 55°C by mixing 12.6 grams of the thus formed tetraene diadduct with 122 grams of pentaerythritol tetrakis (3-mercaptopropionate), 10 grams of the polyester-tetraene resin of Example 2, 1 gram of dibenzosuberone and 0.05 gram of Irganox 1076. A film of this photocurable lacquer composition was applied to printed steel can body stock and thereafter cured using the coating and curing procedures of Example 1. The results were substantially the same.

EXAMPLE 16

To a resin kettle maintained under a nitrogen atmosphere and equipped with a condenser, stirrer, thermometer and a gas inlet and outlet was added 179 grams (1 mole) of 3-isocyanatomethyl-3,5,5-trimethyl-cyclohexyl isocyanate. 116 grams (2 moles) of allyl alcohol was added and the reaction was continued for 4 hours at 90°C with stirring. 100 grams of the resulting diene diadduct of allyl alcohol with the 3-isocyanatomethyl-3,5,5-trimethylcyclohexyl isocyanate was mixed with 83.5 grams of pentaerythritol tetrakis (3-mercaptopropyl ether), 40 grams of the polyester-tetraene resin prepared in Example 8, 2 grams of dibenzosuberone, and 0.2 gram of Irganox 1076. This photocurable lacquer composition was applied as a film and thereafter cured on steel can body stock having ink printed thereon using the application and curing procedures of Example 1. The results were substantially the same.

EXAMPLE 17

4.3 grams (0.2 mole) of trimethylolpropane diallyl ether was added to a resin kettle maintained under a nitrogen atmosphere having a condenser, stirrer, thermometer, and gas outlet and inlet. Next, 264 grams (1 mole) of 3,3'-dimethyl-4,4'-phenylene diisocyanate and 0.5 gram of dibutyl tin dilaurate catalyst were added. Reaction was continued for 5 hours at 120°C with stirring. 20 grams of the resulting tetraene diadduct was mixed with 16 grams of pentaerythritol tetrakis (3-mercaptopropionate), 10 grams of the polyester-tetraene resin of Example 2, 1 gram of dibenzosuberone and 0.1 gram of Irganox 1076. A cured coating of this photocurable lacquer composition was formed on printed steel can body stock using the application and curing procedures of Example 1. The results were substantially the same.

It is to be understood that the foregoing detailed description is given merely by way of illustration and that numerous variations can be made therein without departing from the spirit or scope of the present invention.

What is claimed is:

1. A photocurable lacquer composition comprising (A) a polythiol component containing at least 2 —SH groups per molecule; (B) triallyl isocyanurate as polyene; the relative amounts of polyene to polythiol being selected such that the mole ratio of ene to thiol is from about 0.2:1 to about 5:1; (C) from about 0.0005 to about 50 percent by weight of the composition of a photocuring rate accelerator component; (D) from about 1 to about 50 parts by weight per 100 parts by weight of the polyene-polythiol combination of a polyester-polyene prepared by reacting (a) phthalic anhydride, (b) maleic anhydride, (c) adipic acid and (d) diethylene glycol to form a polyester resin and capping said polyester resin with (e) trimethylolpropane diallyether, the mole ratio of (a):(b):(c):(d):(e) being 1.86:0.62:0.62:3.09:0.02.

2. The composition of claim 1 wherein the polythiol has a molecular weight in the range from about 50 to about 20,000.

3. The composition of claim 1 wherein the polyester has a molecular weight in the range from about 500 to about 100,000.

4. A method for overcoating which comprises applying to a substrate the lacquer composition of claim 1, and thereafter exposing the applied composition to ultraviolet radiation in the wave length range from 100 to 3,800 Angstroms for a period of time sufficient to photocure the composition.

5. A method for overcoating which comprises applying to a substrate the lacquer composition of claim 2, and thereafter exposing the applied composition to ultraviolet radiation in the wave length range from 100 to 3,800 Angstroms for a period of time sufficient to photocure the composition.

6. A method for overcoating which comprises applying to a substrate the lacquer composition of claim 3, and thereafter exposing the applied composition to ultraviolet radiation in the wave length range from 100 to 3,800 Angstroms for a period of time sufficient to photocure the composition.

7. The method of claim 4 wherein the applied composition is from about 0.1 to about 2 mils in thickness.

8. The method of claim 4 wherein the lacquer composition is applied to a printed substrate.

* * * * *